J. OKILL.
PRESSURE GAGE.
APPLICATION FILED MAY 8, 1911.

1,042,958.

Patented Oct. 29, 1912.

WITNESSES
J. P. Davis
P. D. Rollhaus

INVENTOR
JOHN OKILL
BY Munn & Co.
ATTORNEYS

UNITED STATES PATENT OFFICE.

JOHN OKILL, OF ROCK FERRY, ENGLAND.

PRESSURE-GAGE.

1,042,958.  Specification of Letters Patent.  Patented Oct. 29, 1912.

Application filed May 8, 1911. Serial No. 625,773.

*To all whom it may concern:*

Be it known that I, John Okill, subject of the King of Great Britain, residing at 39 Highfield Grove, Rock Ferry, in the county of Cheshire, England, engineer, have invented certain new and useful Improvements Relating to Pressure-Gages, of which the following is a specification.

This invention relates to pressure gages, and has for its object to construct a simple and convenient gage for measurement of the maximum pressure attained in fluctuating or pulsating pressures such as are produced in the cylinders of internal combustion engines.

Figure 1:
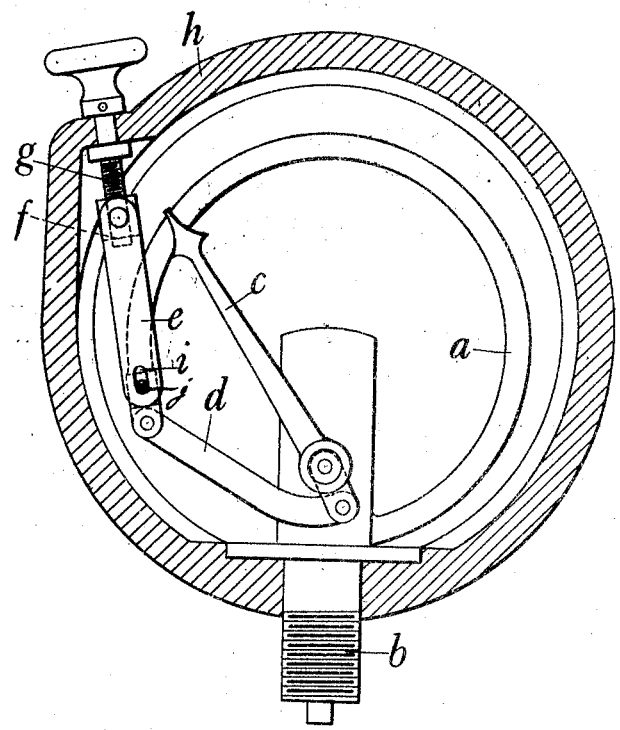
Figure 2:
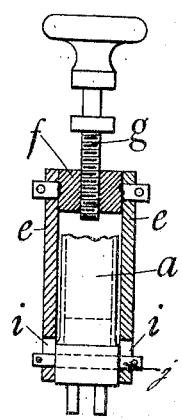

In the accompanying sheet of explanatory drawings:—Figure 1 is a front elevation with the front removed of a Bourdon pressure gage provided with this invention. Fig. 2 is an end section of a portion of the index controlling device.

The same reference letters in the two views indicate the same parts.

In the application of the invention to a Bourdon pressure gage, the usual curved tube $a$ is connected at one end to the pressure inlet $b$ and at the other end to the index $c$ through the medium of a link $d$. It is evident that without special means for controlling the index, rapidly fluctuating or pulsating pressures in the tube would cause such oscillations of the index across the scale that it would be impossible to read the maximum pressures attained.

According to this invention one device for controlling the index consists, as shown in Figs. 1 and 2, in the attachment to the free end of the tube $a$ of a pair of links $e$ hinged by a pin $j$ at one end to the tube and at the other end to a nut $f$ through which passes a screw $g$. The latter is carried in the case $h$ of the gage and provided with an external head or grip piece. At the junction of the links $e$ with the tube $a$ a certain amount of free movement of the tube is permitted (by means of a slot $i$ in each link). To determine the maximum pressure attained in, for example, the cylinder of an internal combustion engine, the gage is put into communication with the engine cylinder. The index then oscillates within the limits permitted by the slots $i$. On rotating the screw $g$ the links $e$ are gradually raised and the index $c$ caused to travel across its scale. So long as the index is below the position of maximum pressure it will continue to oscillate, but as soon as it reaches the position of maximum pressure the oscillation ceases and the required reading can then be taken.

Having thus described my invention what I claim as new and desire to secure by Letters Patent is:—

1. In pressure gages, the combination with an inclosing case and means for imparting movement to an index, of a nut and screw connected to the case, a link situated between the nut and screw and the said means, connections at the ends of the link to the nut and said means respectively, and a slot in the link at one of said connections, substantially as described.

2. In pressure gages, the combination with a Bourdon tube, an index connected thereto, and an inclosing case, of a pair of slotted links, a pin and slot device connecting the links to the free end of the tube, a nut attached to the links, and a screw engaging said nut, said screw being mounted on the case and provided with an operating portion projecting outside the case, substantially as described.

In testimony whereof I have signed my name to this specification in the presence of two subscribing witnesses.

JOHN OKILL.

Witnesses:
John Y. Chaviara,
James Francis Gill.